United States Patent
Ackermann et al.

[11] Patent Number: 5,927,249
[45] Date of Patent: Jul. 27, 1999

[54] ELECTROMOTIVE ADJUSTMENT DEVICE

[75] Inventors: Bernd Ackermann; Axel Schumacher, both of Aachen, Germany

[73] Assignee: U.S. Philips Corporation, New York, N.Y.

[21] Appl. No.: 08/985,983

[22] Filed: Dec. 5, 1997

[30] Foreign Application Priority Data

Dec. 13, 1996 [DE] Germany .......................... 196 51 920

[51] Int. Cl.⁶ .................................................. F16K 31/08
[52] U.S. Cl. .......................... 123/399; 251/65; 310/49 R; 310/156; 310/254
[58] Field of Search .......................... 310/46, 254, 49 R, 310/67 R, 156, 257; 251/65; 123/399

[56] References Cited

U.S. PATENT DOCUMENTS

| | | | |
|---|---|---|---|
| 4,915,074 | 4/1990 | Arai | 251/65 |
| 5,158,262 | 10/1992 | Kamerbeek et al. | 251/65 |
| 5,226,627 | 7/1993 | Hess et al. | 251/65 |
| 5,257,639 | 11/1993 | Prescott et al. | 251/65 |
| 5,785,296 | 7/1998 | Peube et al. | 251/65 |

*Primary Examiner*—Erick R. Solis
*Attorney, Agent, or Firm*—Leroy Eason

[57] ABSTRACT

The invention relates to an electromotive adjustment device with a rotor (9) comprising a magnetized rotary body (8) and with a single-strand, electrically excitable U-shaped stator (11) whose legs (13, 14) form the pole shoes (26, 27) and whose yoke (15) interconnects the two legs (13, 14) and acts as a support for the exciter coil (16), the angular position of the rotor (9) being adjustable by means of the stator current, while the maximum range of the angle of rotation of the rotor is smaller than 180°. Such adjustment devices can be used in particular for the adjustment of a throttle plate in the suction line of an internal combustion engine. To create such an electromotive adjustment device which can be manufactured by a simple technology with small dimensions and low weights, it is provided that the U-shaped stator (11) comprises at least three parts, in that the first part essentially forms the yoke (15) of the stator (11), in that the second and the third part essentially form the legs (13, 14) of the stator (11), and in that the first part (15) is made from an anisotropic material whose preferred direction is substantially aligned with the direction of the magnetic flux in the yoke (15).

11 Claims, 3 Drawing Sheets

ELECTROMOTIVE ADJUSTMENT DEVICE

BACKGROUND OF THE INVENTION

The invention relates to an electromotive adjustment device with a rotor comprising a magnetized rotary body and with a U-shaped stator whose legs form the pole shoes and whose yoke interconnects the two legs, the angular position of the rotor being adjustable by means of the stator current.

Such a device is known from U.S. Pat. No. 5,624,100, issued Apr. 29, 1997. In this known adjustment device, the U-shaped stator is integrally formed from a highly permeable material such as iron, steel, sintered iron, or isotropic magnetic steel. The stator is electrically excitable by means of a single-strand exciter coil. The exciter coil is arranged on the yoke of the stator. This known device is designed in particular for adjusting a throttle plate in the suction line of an internal combustion engine. In this application, a strongly varying torque with high overload torques is to be provided by the electromotive adjustment device over the range of angles of rotation of the rotor because of the air flow in the suction line. A high overload torque is also to be applied partly on account of ice deposits or pollution. The known device must be designed to deal with the operational condition which requires the highest magnetic flux. This leads to a large diameter of the stator, and thus to a high weight. The required magnetic flux is particularly great when a widely opened throttle plate is to be opened yet further at a high stator current, or when an almost closed throttle plate is to be closed yet further at a high stator current. The maximum range of the angle of rotation of the rotor is smaller than 180°.

SUMMARY OF THE INVENTION

It is an object of the invention to provide an electromotive adjustment device of the kind mentioned in the opening paragraph which has small dimensions and a low weight, which is capable of generating very high overload torques for a short period, and which can be manufactured in a simple manner.

According to the invention, this object is achieved in that the U-shaped stator comprises at least three parts, in that the first part essentially forms the yoke of the stator, in that the second and the third part essentially form the legs of the stator, and in that the first part is made from an anisotropic material whose preferred direction is substantially aligned with the direction of the magnetic flux in the yoke.

The yoke of the stator is the most critical location for the control of the magnetic flux because both the magnetic flux generated by the magnetized rotary body and the magnetic flux generated by the exciter coil of the stator are to be accommodated in the yoke.

According to the invention, this critical part of the stator is formed as the first part from an anisotropic material whose preferred direction is substantially aligned with the direction of the magnetic flux in the yoke. Appreciably higher magnetic flux densities can be achieved in the yoke of the stator with such an anisotropic material, the exciter current and the yoke diameter being the same, than with an isotropic material. Compared with a yoke of isotropic material, the diameter of the yoke can be clearly reduced when an anisotropic material is used. This leads to a substantial reduction in volume and weight.

The two legs of the stator are formed as the second and the third part. This three-part construction of the U-shaped stator is favorable from a manufacturing technology point of view. In particular, this construction has the further advantage that the exciter coil of the stator can be coiled as a separate component and can be mounted together with the three parts of the stator.

In an advantageous embodiment of the invention, the second and the third part are each made of an isotropic material.

The isotropic material has the advantage that it is less expensive than the anisotropic material.

In another advantageous embodiment of the invention, the second and the third part are each made of anisotropic material whose preferred direction is the main longitudinal direction of the relevant leg.

In this embodiment of the invention, the preferred direction of the anisotropic material of each leg corresponds to the direction of the magnetic flux in those locations of each leg which is critical for the flux guidance. The locations in the legs which are critical for the flux guidance are the connecting region between the yoke of the stator and the legs of the stator and the central region of the pole shoe formed by each leg, where the cross-section of the leg is at its smallest. The guidance of the magnetic flux by the legs in the direction towards the rotor is largely uncritical. In this range, the cross-section is largely determined by the diameter of the rotor, which is sufficiently great in most cases.

The use of anisotropic material, whose preferred direction corresponds to the longitudinal direction of the respective leg, and accordingly to the direction of the magnetic flux in the leg in the critical locations for the flux guidance, renders it possible to choose the diameter to be smaller in these critical locations as compared with legs made from isotropic material. As a result, the total electromotive adjustment device becomes more compact and lighter. The magnetic flux runs parallel to the anisotropic direction of the material of the legs in the critical locations in the legs only, whereas it is even partly perpendicular to the anisotropic direction of the leg material in locations which are not very critical for the flux guidance. This leads to a good compromise between a simple manufacturing technique, a compact and light construction, and good electrodynamic properties of the adjustment device.

In a further advantageous embodiment of the invention, the pole shoes comprise grooves in the air gap, in which grooves permanently magnetic bodies are inserted which form a reset mechanism for the rotor.

It is advantageous for many applications when the rotor assumes a defined position when the stator current is switched off or interrupted. The reset torque necessary for this may be generated in a simple manner by means of the permanently magnetic bodies.

A further advantageous embodiment of the invention is characterized in that the air gap between the rotor and the pole shoes of the stator has an unevenly distributed width in circumferential direction, so that a detent torque is generated which acts as a reset torque for the rotor.

When the stator coil is without current, the rotor will now automatically assume a preferred angular position which corresponds to the angular position of smallest magnetic resistance for the rotor. Such an uneven arrangement of the air gap can be realized in a simple and inexepnsive manner. No expensive mechanical reset means, for example reset springs, are necessary, and neither are any additional electromagnetic reset arrangements required. The necessary reset torque can be realized either exclusively by means of the air gap of uneven width, or by means of a combination of an air gap of uneven width and permanently magnetic bodies added thereto.

A further advantageous embodiment of the invention is characterized in that the separation surfaces between the first and the second part and between the first and the third part are constructed as oblique surfaces in relation to the main longitudinal direction of the yoke, being at an angle of between 20° and 70° thereto.

Such a construction has a particularly high mechanical stability.

A further advantageous embodiment of the invention is characterized in that the anisotropic material is grain-oriented magnetic steel.

A further advantageous embodiment of the invention is characterized in that the first and the second part and the first and the third part are joined together by means of respective interlocking, centering portions.

Such interlocking centering portions are known, for example, from DE 40 37 953.

The electromotive adjustment device according to the invention may be advantageously used for the adjustment of a throttle plate in a suction line of an internal combustion engine of a motor vehicle.

BRIEF DESCRIPTION OF THE DRAWINGS

A few embodiments of the invention are shown diagrammatically in the drawing and are explained in more detail with reference to FIGS. 1 to 3, in which.

DESCRIPTION OF THE PREFERRED EMBODIMENTS

Figure 1:
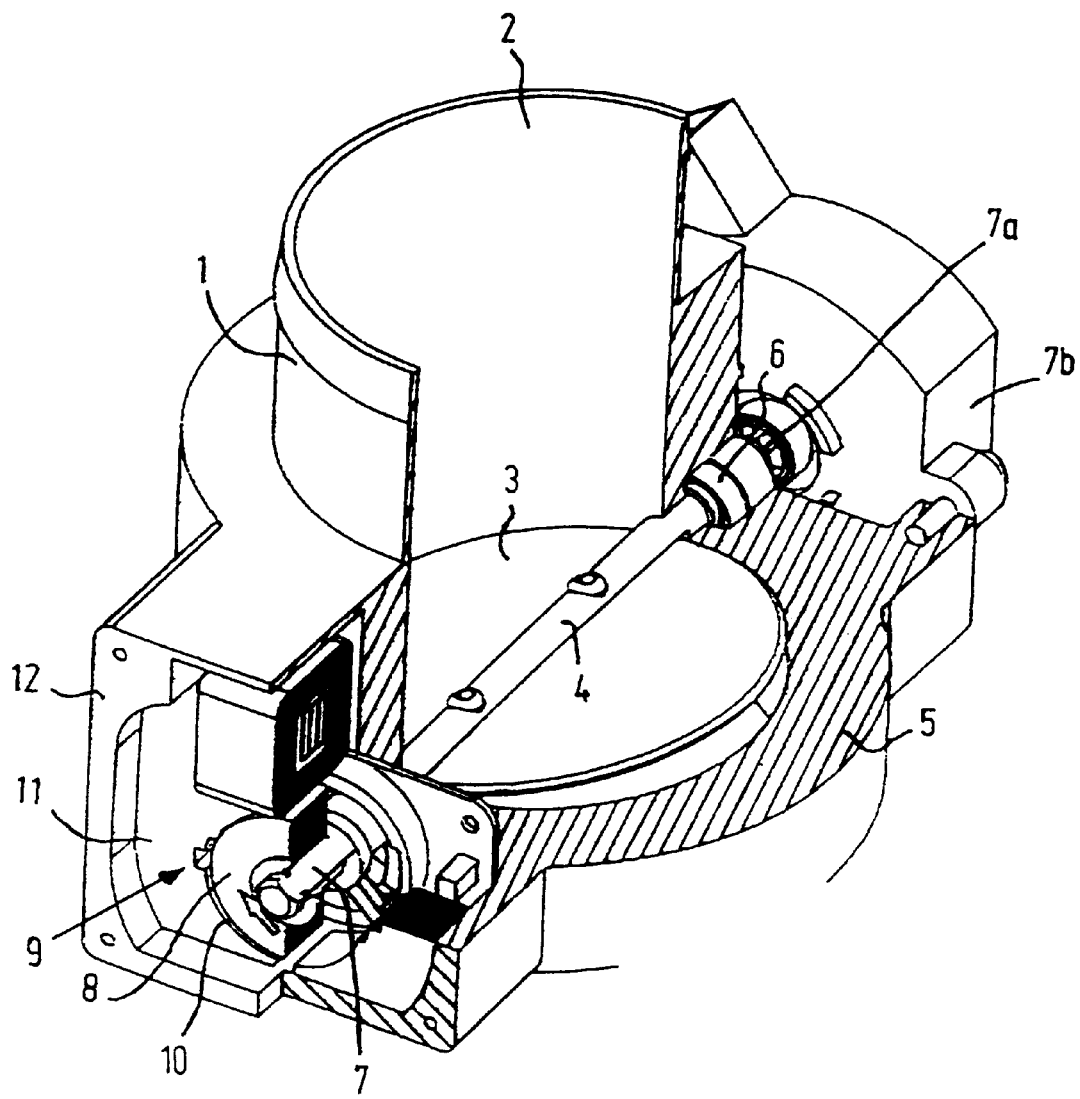
FIG. 1 shows an intake block of an internal combustion engine with an incorporated throttle plate comprising an electromotive adjustment device for operating the throttle plate, in perspective view and partly cut away.

FIG. 1 shows part of an intake block 1 in the suction line of an internal combustion engine. A throttle plate 3 is arranged in the interior space 2 of the tubular block 1, which plate is fastened to a plate shaft 4 which extends centrally through the tubular inner space 2. The plate shaft 4 is journaled in a flange part 5 of the block 1 by means of bearings 6.

The plate shaft 4 has a shaft end 7 extending to the exterior at one end, on which a cylindrical magnetized rotary body 8 is fastened. A position sensor 7b is present on the other shaft end 7a.

The magnetized rotary body 8 is understood to be a rotatable part which may be permanently magnetized or which may be electrically magnetizable. The shaft end 7 together with the magnetized rotary body 8 forms the rotor 9 of an electromotive adjustment device for the throttle plate 3. The rotor 9 is separated from an electrically excitable, U-shaped stator 11 by means of an air gap 10. The U-shaped stator 11 is arranged in a housing 12 of the flange part 5.

Figure 2:
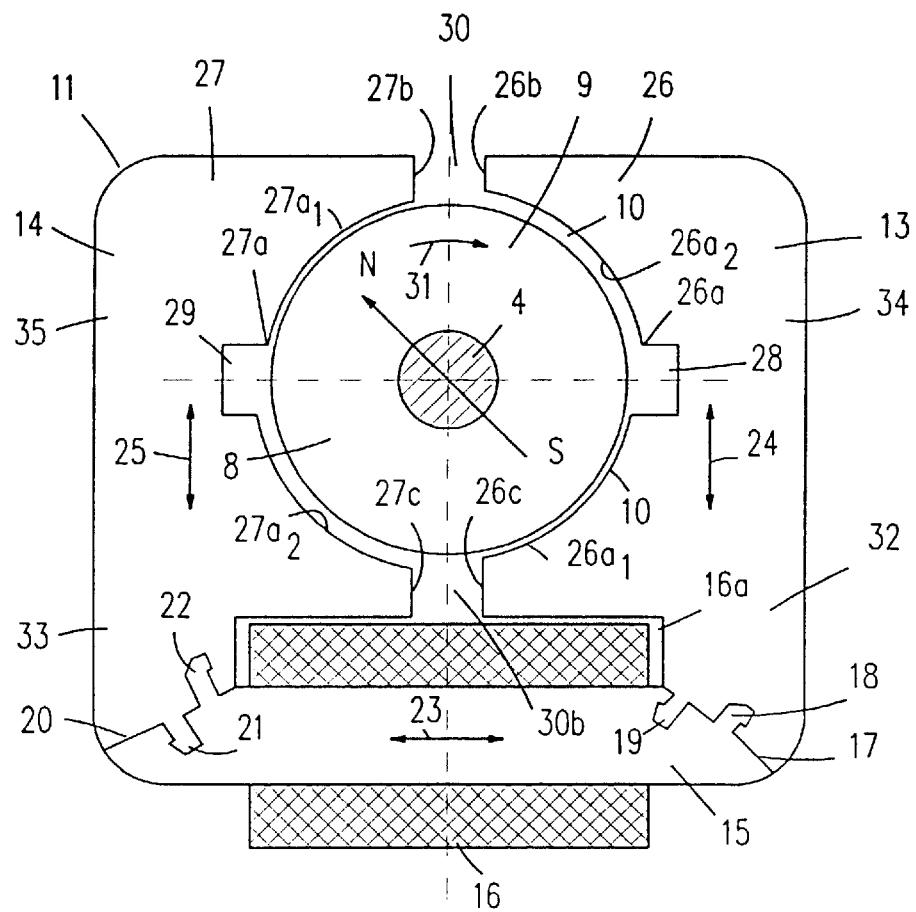
FIG. 2 shows a first embodiment of the electromotive adjustment device comprising a U-shaped stator, built up from three parts, while the air gap between the stator and the rotor is unevenly distributed in circumferential direction.

FIG. 2 shows the stator 11 and the rotor 9 of the electromotive adjustment device for the throttle plate 3 in the non-excited state, in cross-section. The permanently magnetized rotary body 8 is magnetized with two poles, thus comprising a north pole N and a south pole S. The stator 11 is U-shaped and composed of three separate parts. The stator 11 has as its second part a first leg 13 and as its third part a second leg 14. The first leg 13 and the second leg 14 are connected to one another by means of a yoke 15. As first stator part, an exciter coil 16 is wound around the yoke 15. The first leg 13 is joined to the yoke 15 at a first separation surface 17 by means of two interlocking connections 18, 19. The interlocking connections 18, 19 acting as positive locking and centering portions at the same time carry out a centering of the first leg 13 relative to the yoke 15 by means of matching shapes. The second leg 14 is joined to the yoke 15 at a second separation surface 20 by means of two interlocking connections 21 and 22. The interlocking connections 21, 22 at the same time provide a centering of the second leg 14 relative to the yoke 15 by means of matching shapes.

The first leg 13, the second leg 14, and the yoke 15 are each made from grain-oriented, anisotropic magnetic steel. The anisotropic direction of the grain-oriented magnetic steel of the yoke 15 extends horizontally in the direction of the double arrow 23, and is thus aligned with the direction of the magnetic flux excited in the yoke 15 by the exciter coil 16.

The anisotropic direction of the grain-oriented magnetic steel of the first leg and of the second leg extends vertically in the main longitudinal direction of the first leg 13 and the second leg 14, as applicable, in the direction of the respective double arrows 24, 25. The first leg 13 forms a first pole shoe 26, and the second leg 14 a second pole shoe 27. The first pole shoe 26 bounds the air gap 9 with a first pole arc 26a, and the second pole shoe 27 with a pole arc 27a. The pole arc 26a is interrupted approximately in its center by a groove 28, and the pole arc 27a is interrupted approximately in its center by a groove 29. These grooves 28 and 29 magnetically have approximately the same effect as an opening 30a between the pole shoe ends 26b and 27b and an opening 30b between the pole shoe ends 26c and 26c. As a result, partial pole arcs $26a_1$ and $26a_2$, and $27a_1$ and $27a_2$ are created on either side of the central grooves 28 and 29. The air gap 10 has differing, non-constant widths. On average, it is smaller between the partial pole arcs $26a_1$ and $27a_1$ and the rotor 9 than between the partial pole arcs $26a_2$ and $27a_2$ and the rotor 9.

The dimensioning of the rotor 9 and the stator 11 is so designed that the device is to have a high retention torque. In the idle state, i.e. when the exciter coil 16 is without current, the rotor 9 will assume the desired rest position in accordance with its magnetization in the regions of the partial pole arcs $26a_1$ and $27a_1$, which corresponds to the position of the lowest magnetic resistance, as shown in FIG. 2. When the exciter coil 16 is energized, the rotor 9 will move against the magnetic reset forces in clockwise direction into an opening direction 31. The retention torque acting against this movement, i.e. against the opening direction 31, always tends to move the rotor 9 back into its rest position.

The anisotropic magnetic steel used for the first leg 13, the second leg 14, and the yoke 15, has the advantage over isotropic magnetic steel that higher magnetic flux densities can be achieved for a given field strength. This renders it possible to reduce substantially the cross-section of the laminations in the relevant location, which leads to a corresponding reduction in volume and weight. The electromotive adjustment device of FIG. 2 has three particularly critical locations for the flux guidance:

a) the yoke 15, since this is to accommodate both the magnetic flux generated by the magnetized rotary body 8 and that generated by the exciter coil 16;

b) the transition regions 32 and 33 between the yoke 15 and the first leg 13 and the second leg 14, respectively, adjacent the coil window 16a of the exciter coil 16. The flux in these transition regions 32 and 33 is substantially vertically directed, in the direction of the double arrows 24 and 25;

c) the central regions 34 and 35 of the first leg 13 and the second leg 14 behind the respective grooves 28 and 29. The magnetic flux in these regions is also substantially vertical, following the direction of the double arrows 24 and 25.

By contrast, the guidance of the magnetic flux by the legs 13 and 14 in horizontal direction to the rotor 9 is substantially non-critical. The cross-section in this region is substantially determined by the diameter of the rotor 9 and is sufficient in most cases.

In the electromotive adjustment device of FIG. 2, the anisotropic direction of the grain-oriented magnetic steel from which the first leg 13, the second leg 14, and the yoke 15 are made substantially corresponds to the direction of the magnetic flux generated by the magnetized rotary body 8 and the exciter coil 16 in the three critical locations described above. This renders it possible to realize the electromagnetic adjustment device in a very compact form of low weight. The construction of the stator 11 from three parts can be readily realized as far as manufacturing technology is concerned, and in addition has the advantage that the exciter coil 16 is wound as a separate component which can subsequently be assembled together with the three parts of the stator 11.

Figure 3:
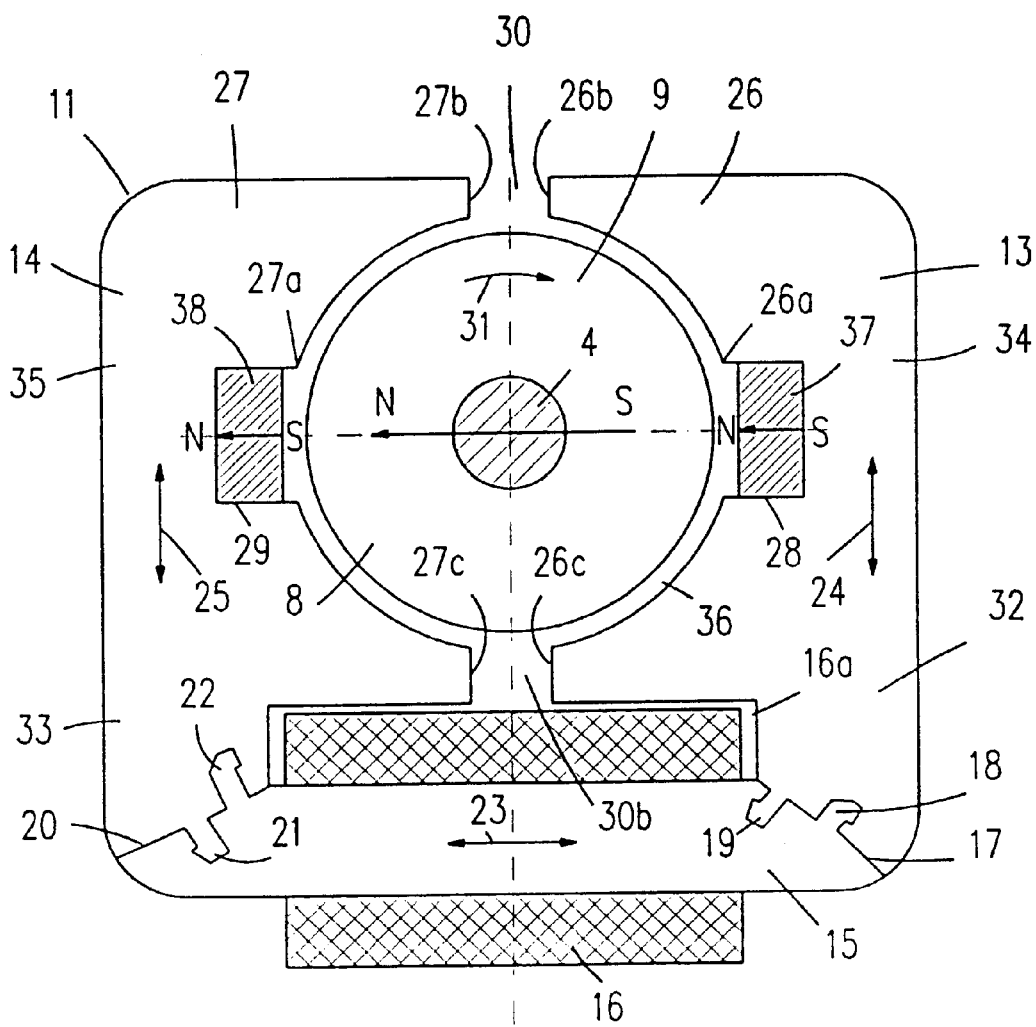
FIG. 3 shows a second embodiment of the electromotive adjustment device comprising a stator built up from three parts and comprising grooves at the air gap side in which permanent magnetic bodies are inserted.

FIG. 3 shows a second embodiment of the electromotive adjustment device in the non-excited state, in cross-section. The construction of the adjustment device in this second embodiment largely corresponds to the construction of FIG. 2, for which reason the same components have been given the same reference numerals.

In the second embodiment shown in FIG. 3, permanently magnetic bodies 37 and 38 have been inserted into the grooves 28 and 29 of the first leg 13 and the second leg 14, respectively, of the stator 11. The direction of magnetization of these magnetic bodies 37 and 38 is diametrical. In contrast to the air gap 10 of the embodiment of FIG. 2, the air gap 36 of the embodiment of FIG. 3 has been given a constant width between the rotor 9 and the stator 11 in the regions of the pole shoes 26 and 27.

The permanently magnetic bodies 37 and 38 form a reset mechanism for the rotor 9 and generate a magnetic flux of a strength and direction such that the rotor 9 tends to align itself into the rotor position shown in FIG. 3, following the direction of the magnetic flux of the magnetic bodies 37 and 38, when the exciter coil 16 is not energized. When the exciter coil 16 is energized with the rotor in this position as shown in FIG. 3, the adjustment device will not cause a torque because of the symmetry of the arrangement. It can be prevented by means of a mechanical abutment (not shown) that the rotor 9 occupies the position shown in FIG. 3 when the exciter coil 16 is not energized. The abutment may be so arranged, for example, that the angular position occupied by the rotor 9 with the exciter coil not energized is shifted by 5° with respect to the angular position shown in FIG. 3. When the exciter coil 16 is energized in this shifted position defined by the abutment (which is not shown), then the adjustment device will generate a torque, and the rotor 9 will readjust itself in clockwise direction into an opening direction 31 against the magnetic reset forces. The reset torque acting against this adjustment, i.e. against the opening direction 31, continuously tends to move the rotor 9 back into the angular position shown in FIG. 3.

We claim:

1. An electromotive adjustment device with a rotor (9) comprising a magnetized rotary body (8) and with a U-shaped stator (11) whose legs (13, 14) form the pole shoes (26, 27) and whose yoke (15) interconnects the two legs (13, 14), the angular position of the rotor (9) being adjustable by means of the stator current, characterized in that the U-shaped stator (11) comprises at least three parts, in that the first part essentially forms the yoke (15) of the stator (11), in that the second and the third part essentially form the legs (13, 14) of the stator (11), and in that the first part (15) is made from an anisotropic material whose preferred direction is substantially aligned with the direction of the magnetic flux in the yoke (15).

2. A device as claimed in claim 1, wherein the second and the third part (13, 14) are each made of an isotropic material.

3. A device as claimed in claim 1, characterized in that the second and the third part (13, 14) are each made of anisotropic material whose preferred direction is the main longitudinal direction of the relevant leg (13, 14).

4. A device as claimed in claim 1 wherein, the pole shoes (26, 27) comprise grooves (28, 29) in the air gap (36), in which grooves permanently magnetic bodies (34, 35) are inserted which form a reset mechanism for the rotor.

5. A device as claimed in claim 1 wherein, the air gap (10) between the rotor (9) and the pole shoes (26, 27) of the stator (11) has an unevenly distributed width in circumferential direction, so that a detent torque is generated which acts as a reset torque for the rotor.

6. A device as claimed in claim 1 wherein, the separation surfaces (17, 20) between the first (15) and the second part (13) and between the first (15) and the third part (14) are constructed as oblique surfaces in relation to the main longitudinal direction of the yoke (15), being at an angle of between 20° and 70° thereto.

7. A device as claimed in claim 1 wherein, the anisotropic material is grain-oriented magnetic steel.

8. A device as claimed in claim 1 wherein, the first (15) and the second part (13) and the first (15) and the third part (14) are joined together by means of respective interlocking, centering portions.

9. The use of the electromotive adjustment device as claimed in claim 1 for the adjustment of a throttle plate (3) in a suction line (1) of an internal combustion engine.

10. An internal combustion engine comprising an electromotive adjustment device as claimed in claim 1.

11. A motor vehicle comprising a device as claimed claim 1.

* * * * *